United States Patent [19]

Edwards

[11] Patent Number: 4,754,473
[45] Date of Patent: Jun. 28, 1988

[54] REMOTE TELEPHONIC DATA TRANSCRIBING SYSTEM

[76] Inventor: Willie Edwards, 312 Kingston Dr., King, N.C. 27021

[21] Appl. No.: 919,463

[22] Filed: Oct. 16, 1986

[51] Int. Cl.$^4$ .............................................. H04M 1/27
[52] U.S. Cl. ........................................ 379/58; 379/61; 379/96; 379/57
[58] Field of Search .................. 379/57, 59, 61, 96, 379/58; 340/825.44, 825.49

[56] References Cited

U.S. PATENT DOCUMENTS

| | | | |
|---|---|---|---|
| 4,275,385 | 6/1981 | White | 340/825.49 |
| 4,336,524 | 6/1982 | Levine | 340/311.1 |
| 4,356,509 | 10/1982 | Skerlos et al. | 358/85 |
| 4,456,793 | 6/1984 | Baker et al. | 379/61 |
| 4,471,165 | 9/1984 | De Fino | 379/96 |
| 4,661,972 | 4/1987 | Kai | 379/57 |

Primary Examiner—Robert Lev

[57] ABSTRACT

A telephonic communications system (FIGS. 1 and 2) designed to use the availability of ordinary subscriber telephone lines to which a telephone instrument (312) is conventionally attached. Whenever it is desirable for a caller (306 or 309) to transmit data from a calling telephone (305, 308 or 316) a special code is input to the called telephone (312 or 301) which, through detection circuitry, activates an intercept system (184A of FIG. 11) within the called telephone, which inhibits audible ringing of the called telephone instrument and connects a second system (FIGS. 10 and 14) incorporated within the same called telephone instrument for auto-tuning, processing, and re-transmitting from the called telephone subsequent received data to a remote addressable portable data unit (302 or 311). The remote data units (302 and 311) communicate with the telephone instrument (301 and 312) via a radio frequency data link, through which it may either receive data from or transmit data to the telephone instrument. The communication system can operate without the need for human intervention at the calling or called telephone instrument and neither calling nor called telephone instrument need be manually placed off-hook for end-to-end operation.

22 Claims, 13 Drawing Sheets

REMOTE TELEPHONIC DATA TRANSCRIBING SYSTEM

BACKGROUND

This present invention relates to the cordless telephone system. However, its differences are as numerous as its similarities. In its overall implementation, some of its functions embody the principles of the walkie-talkie, pager, modem and a universal remote dialing unit.

Many factors of the above individual applications are already known but the systemization of these applications bring about a unique method of telephone communication.

The airways are already quite crowded with radio-frequency signals. So much so that strict allocation of transmission classification must be adhered to. The transmission spectrum is limited and therefore, in effect, the ability to communicate by this means is effected directly.

What the invented system herein contains is the hardware and conventional applications needed to further exploit the already pervasive telephone implementation and operate "under" the existing radio-frequency broadcast spectrums. The invention allows signals to be "piped" so far via the normal telephone wires already in existence and after reaching the destination telephone, to be aerially transmitted to the receiving device several hundred feet away.

This communication principle allows the person transmitting dual tone multiple frequency signals from the far-end telephone to input information to the receiver in the general area of the called telephone. The communication arrangement therefore can be used in hospitals, missile silos, mines and in large factories to transfer information to data equipment or to individuals. In so doing, the system can not only store raw data as a portable memory but it can also be used to control medical equipment, robots, environmental, fire and security systems from literally anywhere in the world so long as a telephone is nearby.

In a world where information movement, mobility, privacy and personal safety are increasing in priority, the invention described herein will help attain these priorities. Portable computers, for example, can access data banks from truly remote areas. Those wishing to transmit data from the safety of their automobiles but do not have a mobile (cellular) telephone in their automobile may do so. The invention not only makes possible the accomplishment of the above priorities but will, in fact, help to universalize these achievements in the societies in which they are adopted.

The invention has the advantage of being able to immediately establish local area networks (LANs). And—in the interest of security—to de-establish these LANs even more quickly. The potential to establish wide area networks can also be appreciated.

In system arrangements where automatic dial-up is employed, the system can be configured to facilitate one telephone dialing up and programming a second telephone—the second telephone being our destination telephone. The aforementioned procedure being done without human intervention.

The inventinon will achieve the above mentioned means by employing a number of implements and transmission techniques—the primary transmission technique being that of using the telephone system in a modified format as the intermediate link which comprises the greater transmission distance.

SUMMARY

In its preferred embodiments the telephonic communication system disclosed herein employs a number of key components to complete its objectives.

The primary objective of the present invention is to provide an easy to install system which can utilize the already installed telephone-based communication system as its major data link and alleviate the problems of having to transmit higher power radio frequency waves to facilitate a communication link with a very large plurality of portable modem-oriented data transcribing devices. These portable data transcribing devices afford the same type of mobility as a pager but each data transcribing device is completely equipped to operate in a data communication environment. Such a system, then, would permit easy transmission of data simply by plugging in a user-carried telephone anywhere there is a conventional telephone line, turning on his portable data transcribing device and going to work.

In order to accomplish the foregoing primary object of the invention, there is provided a plurality of modified telephone instruments conveniently attachable to conventional telephone subscriber lines. Basically the modifications within the telephone instruments comprise, in integrated circuit format, a system whereby a calling party may dial any telephone within the operating vicinity of the portable data transcribing device he wishes to output data into. There is provided, by means already established by patent, a method by which the caller can insert a tone to activate a ring silencing system within the called telephone. Having done this, the invention automatically brings in data processing and data-relay circuits combined to turn the called telephone into an intermediate data-relay station with the primary link being the telephone system's common transmission lines and the secondary link a radio frequency link, through which link the called telephone's data circuitry is able to automatically establish by receiver-transmitter auto-tuning and by converting the mobile data transcribing device's address sent by the caller into an aerially transmitted signal. Subsequent data sent over the telephone network is sent via the aerially transmitted signal from the called telephone to the addressed mobile data transcribing device.

Within the addressed mobile data transcribing devices, which may be completely independent and hand-carried or, more practically, mounted within data peripheral equipment, there is provided in the receiver mode mass data storage and throughput capabilities. Through an output jack data is immediately made available to an attached peripheral device. In the output mode of the mobile data transcribing devices there is provided a matrix control means and a dual-frequency transmission means through which telephone line-contention and secure data transmission takes place, this time, back in the opposite direction through the telephone network—that is, with the signals originating from the mobile data transcribing device instead of being received by the device as before. When data is transmitted in this latter mode the mobile data transcribing device has, through built-in circuitry, means to automatically input its own address to the telephone network.

All of the foregoing transmissions are designed to take place while the modified telephone's handset remains in its cradle and requiring no human intervention at the telephone instrument.

The foregoing and other objects of this invention will be more fully understood from the following detailed descriptions and references to the accompanying drawings.

PULSE SIGN ON/SIGN OFF

Figure 1:
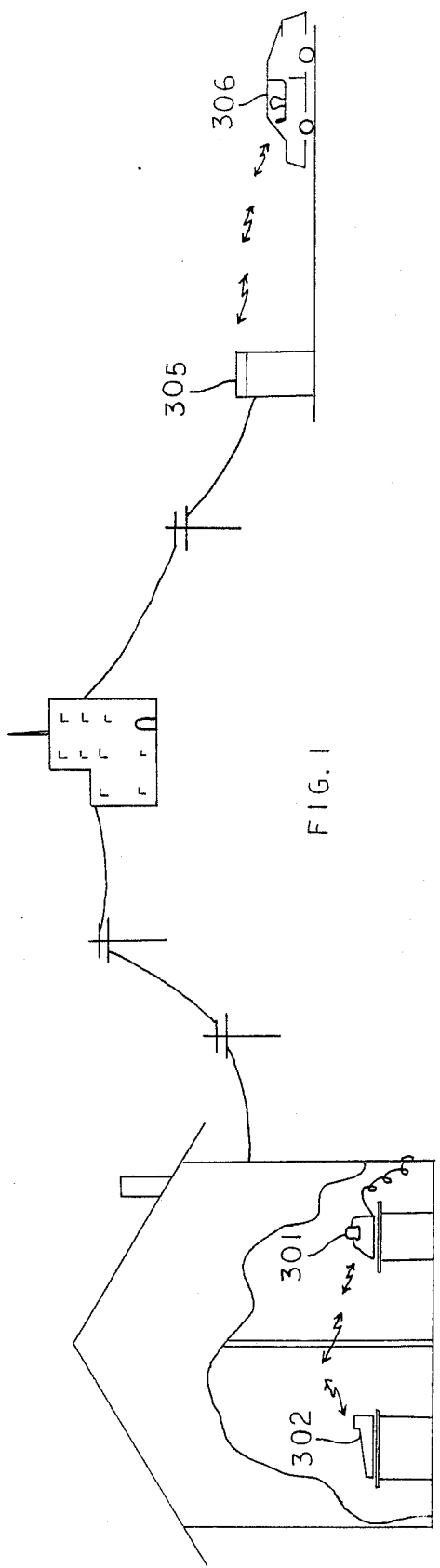
FIG. 1 is an illustration of the local application of the telephone communication system pertinent to the present invention.

This facet of the invention relates to a telephone intercept circuit. In a more specific sense, it is designed to work in conjunction with other telephone ring-intercept circuitry and, as such, permits a caller to inhibit a ringing signal in the called telephone by using or sending a rotary dial pulse or series of pulses.

There is already in existence an intercept circuit which inhibits ringing and accesses a peripheral connected to the called telephone by sending a tone. However, while dual tone multiple frequecy (DTMF) is in widespread use, a tone controlled circuit by itself would greatly restrict the potential for universal application of the Callwriter System.

What the implementation of the dial-pulse control circuit would do is eliminate the aforementioned restrictions so that either DTMF or dial-pulse signals could be used to access any telephone.

It is not necessary that one be familiar with the DTMF facet of the intercept control circuitry in order to comprehend the general functioning of its dial-pulse control counterpart contained herein. However, without an operational overview of this, the interface of the system, the system's continuity might appear broken.

The circuitry for latching and unlatching relays with the use of dual tone multiple frequency input is shown in U.S. Pat. No. 4,345,113, the inventor being Edwin F. Shelly.

Included in the drawings of this present invention, however, is a circuit for the latching and unlatching of relays to access a peripheral device in the event the caller utilizing the Callwriter System is originating the call from a dial-type telephone which outputs pulses.

Figure 11:
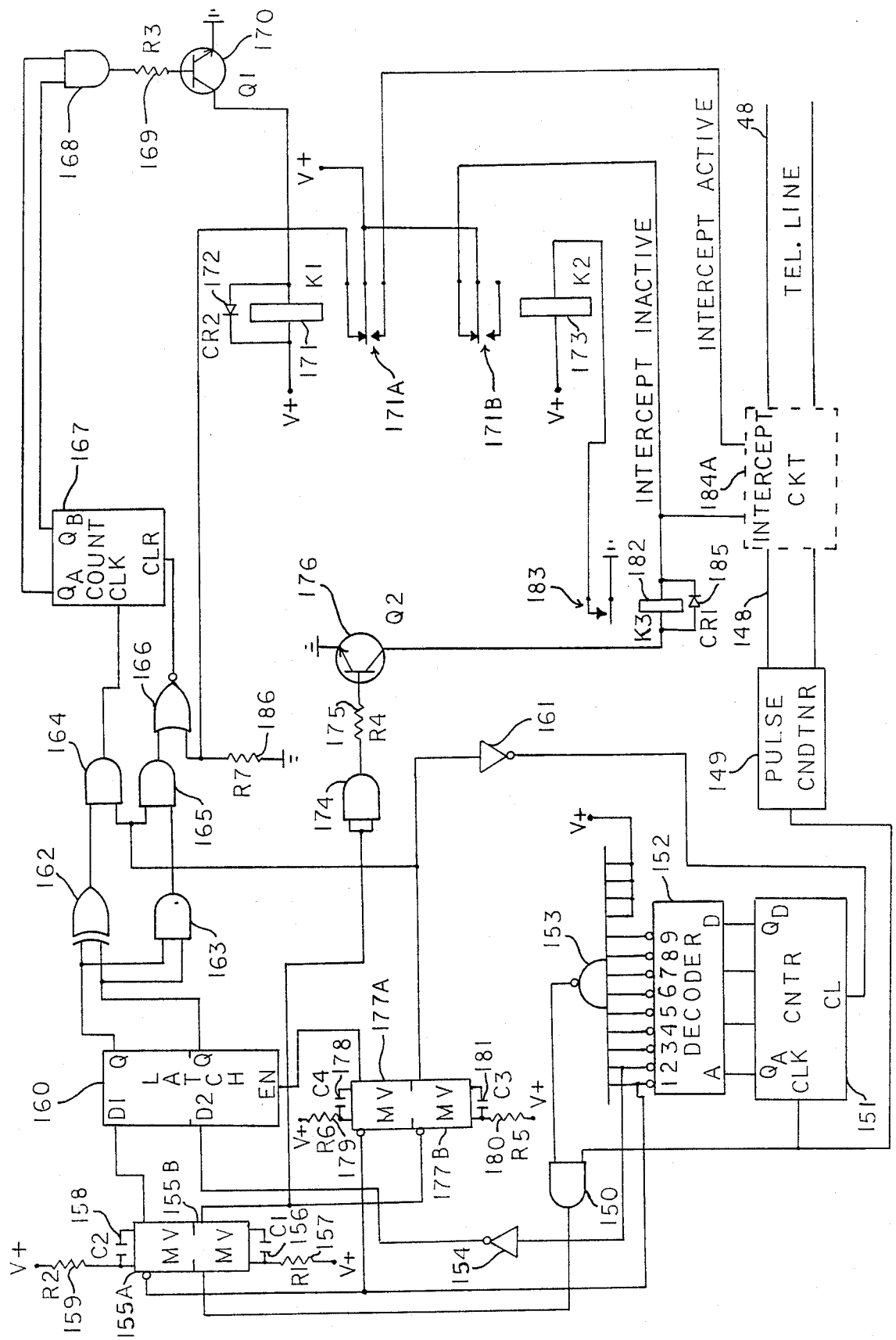
FIG. 11 is a diagram of the pulse sign on/sign off circuit used to communicate with a data system connected to a far-end telephone.

Refer to FIG. 11.

The aforementioned intercept circuitry is labled 184A.

In detail, when a caller wishes to use the Callwriter System, he dials the number of the Callwriter data bypass unit of which the intercept circuitry 184A is merely the interface. This data bypass unit (DBU) has the same peripheral address as the called telephone (i.e. seven digits).

The caller thereafter has a predetermined time period in which he may initiate procedures to activate the circuitry which will mute the ring on the called telephone. He does so by dialing, for instance, the number five. Upon release of the rotary dial, a pulse series is generated. These pulses are carried on the internal transmission lines 148. The lines are the inputs of pulse conditioner 149. From the conditioner 149 these processed pulses are applied to one of the inputs of dual input and gate 150. These pulses are also trained into the clock input of synchronous counter 151. This pulse train is reflected at the outputs Qa, Qb, Qc and Qd of counter 151. As outputs Qa, Qb, Qc and Qd of counter 151 respond, their instantaneous binary representation is presented to the binary coded decimal inputs A, B, C and D of decoder 152. The single decimal conversion, of course, appears at the appropriate output one through nine—alternately driving these normally high outputs low. Numeric outputs one through five on decoder 152 will sequence through low states. Consequently, the output of nand gate 153 will go high through the sequence of incoming pulses. Combined with the pulses at the remaining input of and gate 150 a series of pulses is therefore generated at the input of multivibrator 155B. Multivibrator 155B is retriggerable. The output pulse width of multivibrator 155B is determined by RC combination R1 157 and C1 156. Due to its retriggering, the extended high pulse at the output of multivibrator (MV) 155B shows up as an extended high input to and gate 174. This causes the high output of and gate 174 to be applied through resistor R4 175 to the base of NPN transistor Q2 which is 176. This pulse, turning on transistor 176 causes relay K3 which is 182 to operate through contacts 171B whose common contact is tied to plus voltage. When relay 182—across whose coil is diode CR1 185—operates, contacts 183 close connecting one side of relay latching coil K2 which is 173 to ground. The other side of the latching coil of relay 173 is tied to plus voltage. When relay 173 latches, the normally open contacts of contact assembly 171A closes connecting the intercept active line to the plus voltage tied to the common contact of contact assembly 171A. This action effectively puts the system user "into" the Callwriter System. Relay K3 182 drops out at the end of the retriggered pulse generated by MV155B, but the low going pulse is sensed at the active low input of MV177B. The resulting output pulse is inverted by inverter 161 and this low inversion applied to the clear of counter 151 erasing the contents therein. Meanwhile, the caller has the availability of the system to input data.

When the caller has finished inputting data and now wishes to release the DBU restoring the telephone to its conventional status, he may do so by dialing a succession of numbers. We can release the system by putting into the ciruitry a succession of ones. More exactly, three ones in succession, which technique the caller has prior knowledge of in his familiarization with the system. Although three successive ones will release the DBU, perhaps a better insight can be gained by showing the putting in of a number other than one. Assume the caller therefore has dialed a two. The counter accepts the digit from the pulse conditioner 149 and outputs a low first on decoder 152 numeric terminal one and then on terminal two. However, when the first incoming pulse of two pulses is indicated on decoder 152 numeric terminal one, its low going resultant of decoder 152 same output terminal one is applied to the active low input of MV155A. This pulse is also applied to the active low input of MV177A. MV155A has its RC pulse output duration components R2 159 and C2 158 such that the output pulse lasts for the duration of pulse number one and a goodly part of the anticipated second pulse. The first pulse, therefore, is stretched at the output of MV 155A and applied to the D1 input of latch 160. The second of the two pulses—which is now arriving at numeric output two of decoder 152—is converted high at the output of inverter 154 and appears at the D2 input of latch 160. At this point both of the inputs to latch 160 are high. MV177A has at its output by virtue of its RC timing elements R6 179 and C4 178 a signal which enables the latch and secures the two high bits therein. These two bits appear at the Q outputs of the latch where they are the inputs to exclusive or gate 162, also to and gate 163. Thus, our "two" is latched but our incoming signal via nand gate 153, and gate 150 and MV155B then continues through MV177B via its active low input. It can be seen that this same MV177B has its output signal duration determined by R5 180 and C3 181. At the output of MV177B then, our signal's purpose is twofold. Through inverter 161 it is now free to clear the counter 151. This signal is also able to combine at and gate 165 with the high signal from and gate 163. The resulting high output from 165 drives the output of nor gate 166 low clearing any bits which might have been in counter 167. Thus, this counter 167 has at its outputs Qa and Qb low levels. Looking ahead, then, through and gate 168 and transistor Q1 170 we see that this clearing of counter 167 cannot cause relay K1 171 to unlatch rendering the interface of the DBU inactive even though we would like for it to be.

Three ones will release the circuit as we will see, but, it can be said that the above simulation could have been representative of a user putting in an undetermined number and sequence of digits such as would be the case in transmitting data.

When the user dials the first one the pulse shows up at numeric output one of decoder 152. Input, as explained earlier, to the active low of MV155A this digit is passed on and latched into latch 160 through its input D1. Recall the first pulse's duration at output of MV155A extends into the anticipated arrival and duty cycle of the second pulse. This situation prevails regardless of whether a second pulse arrives or not. Since no second pulse has arrived the situation is one in which we are left with an inactive high on numeric output two on decoder 152. Through inverter 154 this signal shows up as a low on the D2 input of latch 160. This time, therefore, when the first pulse which is now turned enabling pulse through MV177A arrives at the enable of latch 160 it will have a low to latch as the second data bit. This high level and low level at the Q outputs of latch 160 will pass through exclusive or gate 162 and when the gating pulse arrives again will combine with the output of exclusive or gate 162 to produce a high pulse at the output of and gate 164. This clock pulse on counter 167 drives its Qa output high. The second input of digit one by the user drives Qa low and Qb of counter 167 high. Of course, we are looking for Qa and Qb high simultaneously in order that we can get a high output on dual input and gate 168 to turn on transistor Q1 170. This, in turn, will unlatch our circuit by operating the unlatch coil of K1 171. This, then, is what the third successive dialing of digit one does. Through transistor Q1 170 the unlatching coil, which has across it diode CR2 172 brings the upper contact of 171B and its common contact tied to plus voltage together. This action renders the intercept circuitry 184A inactive. At the same time the upper contact of 171A makes with its common member which is tied high, thus making the output of nor gate 166 low and clearing counter 167.

If at anytime in our dialing of the release digits of three consecutive ones we had had another digit intercede—and this could very well have been a data input procedure instead of a sign-off initiation—the counter 167, through its pulse steering input logic would have seen the number greater than one and would have been sent a clear signal via dual input nor gate 166 which has its other input stabilized through resistor R7 186. The counter therefore having been cleared would still necessitate the user putting into the circuit the required three consecutive ones.

The sign-off code could be changed suitably by altering basically the pick-off at the decoder 152 and the RC combination of R2 159 and C2 158 of MV155A. It could also be changed by putting a higher demand on the operation of Q1 170 through resistor R3 169 by adding another output from counter 167 to the appropriate and gate 168.

SUBSCRIBER TRANSMITTER

Figure 6:
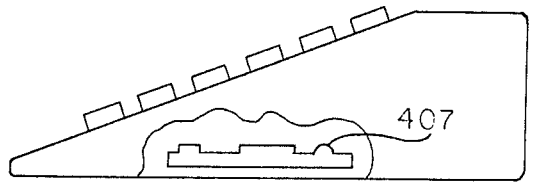
FIG. 6 shows a piece of data equipment within which is installed a printed circuit transceiver used primarily in the application as described in FIG. 1.
Figure 7:
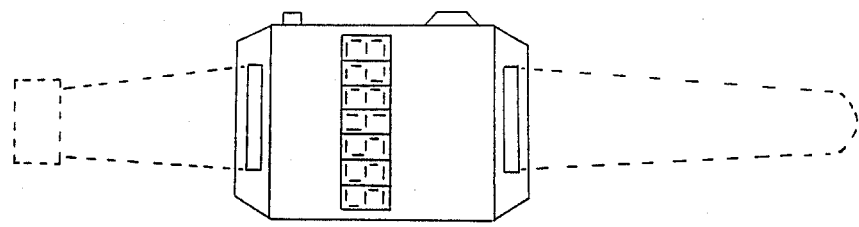
FIG. 7 shows a wrist-worn device which is a subscriber data receiver and transcriber designed to operate in the systems of FIGS. 1, 2 and 3.

This facet of the invention relates to the handset of the mobile telephones which themselves consist of a base station and a detached mobile handset. Concerning this invention, its counterpart—which functions as the base—is described in other parts of this documentation. The implementation of this invention affords the subscriber the ability to operate a keypad equipped peripheral and gain access to Solomon (subscriber open loop monitor). Technically referred to as the subscriber transmitter, its implementation can be better understood by viewing it as it fits into the communication link of Solomon. Such a view is presented in FIG. 1 where the unit is embedded in a keypad operated appliance 302. A close-up view 407 is presented in FIG. 6. It should be said that this same unit diagrammed in FIG. 13, while sometimes constructed solely as a transmitter, will also be found combined and integrated with a receiver thereby forming a subscriber transceiver. In fact, FIG. 1 item 302, FIG. 1 condition 306, FIG. 2 condition 311 and FIG. 8 all depict the unit as either a lone transmitter or combined with the subscriber receiver—the choice by the subscriber being a matter of economical and practical expedience.

Figure 8:
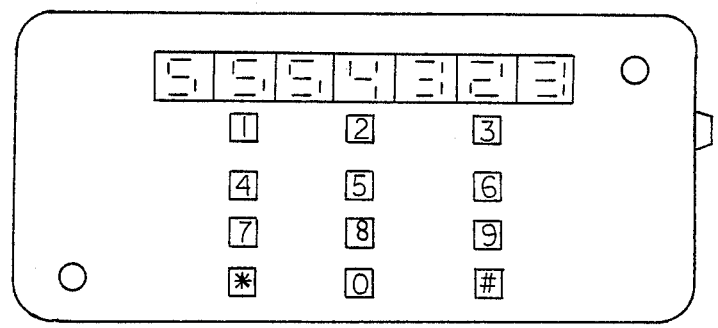
FIGS. 8 and 9 show a subscriber pocket transceiver/transcriber designed to operate in varying degrees in the systems of FIGS. 1, 2 and 3.
Figure 9:
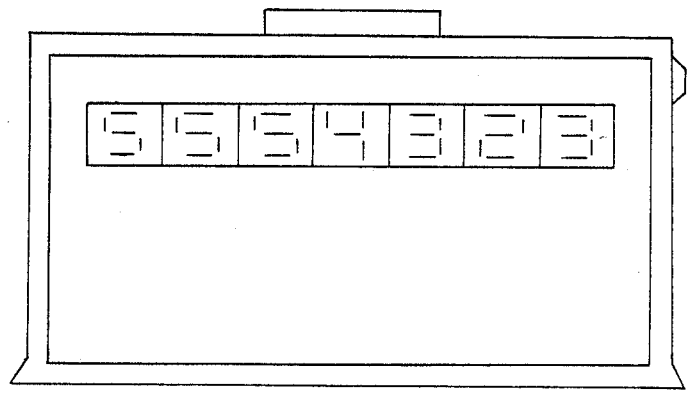
Figure 13:
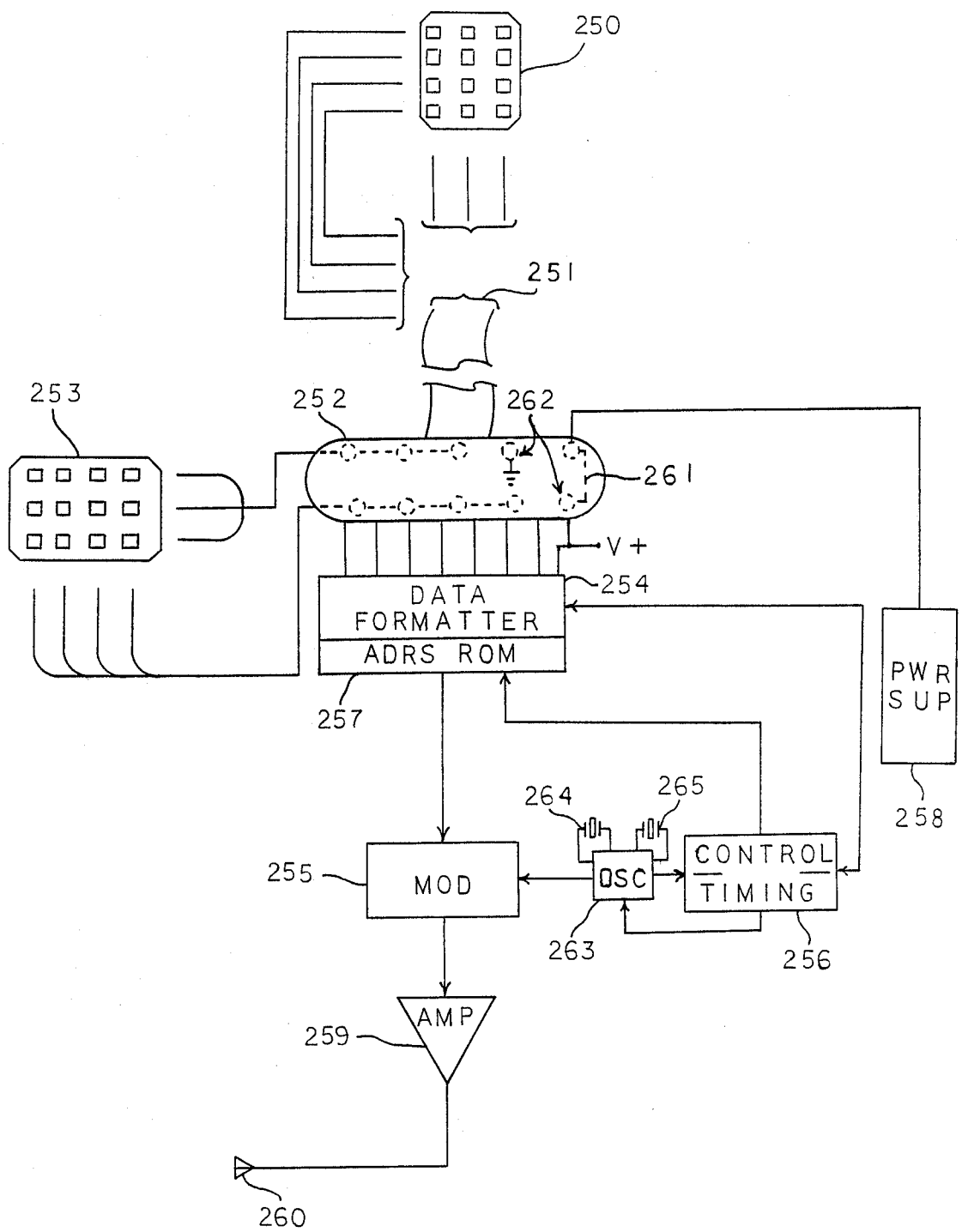
FIG. 13 is a subscriber transmitter often combined with the circuit of FIG. 12 and used to communicate with a telephone as described in FIGS. 1 and 2.

Further optional capabilities can be seen by observing the diagram of the subscriber transmitter shown in FIG. 13. The unit has two possible keypad entry modes. To the left of the diagram is shown one keypad 253. This keypad is the common circuit keypad which can be structured as part of the subscriber transmitter as is shown in FIG. 8. Such an arrangement is considered when it is the intention of the subscriber to utilize the transmitter as a mobile hand-held unit which can also receive. However, should the subscriber find it more to his or her advantage to employ the unit solely as an appliance-bound fixture, if the room within the appliance is available, he can insert the unit within the appliance, remove the snap-off cover 252 and with the use of a flat ribbon cable 251 access the transmitter circuitry using the remote keypad assembly 250 (i.e. the appliance keypad 250). The unit can be structured as a plug-in printed circuit card presenting a less bulky situation. On the other hand, depicted as is, when mounted within the cabinet of the appliance and the snap-off cover 252 is removed, in addition to allowing access by the remote (appliance) keypad 250, the unit's power supply input line 261 is interrupted which sets up a situation whereby the transmitter is to be powered by an outside source through line 262. This allows the unit to be left on for indefinite periods of time without running down the internal power supply 258 which is battery sourced, since the unit's primary use was intended as portable and hand-held.

When the unit is installed in a keypad operated appliance, such as is the case in FIG. 1 condition 302, and the subscriber wishes to access Solomon, he or she may do so by entering the data bypass unit's (DBU) address code using the transmitter's keypad 250. Shown in FIG. 13 are two keypads—which could be keyboards in an enhanced version—which could be used. However, only one keypad is used at a time.

Refer to FIG. 13.

In operation, the subscriber transmitter is straightforward. However, there are two basic transmission formats to the subscriber transmitter.

In the first format, when it can be assumed that the the transmitter has been idle for a finite period of time, the subscriber can proceed to key in the seven digits of the Solomon-type telephone he wishes to access the system through. Due to its architecture, the subscriber transmitter will interpret these first seven characters (receiver's address or telephone number) as system access characters and will save them in the data formatter 254 until the seventh character is keyed in. Upon reception of the seventh character the transmitter will proceed to transmit all seven characters-which will be block oriented. That is, seven blocks of data will be transmitted. The structure of the blocks is as follows; synchronization bits, receiver address bits, transmitter address bits and a single character. The formatter 254 has available to it the transmitter's own address in read-only-memory (ROM) 257. Since the single character is transmitted with each block, indeed, seven blocks would provide a complete dialed number.

The second transmission format differs from the first format in that additional characters keyed in are not saved for a seven block stringed transmission but are transmitted upon being keyed in—one character per block, with the block structure being the same as that of the first format.

When a key on keypad 253 is depressed, the row and column representing the character shows up at the data formatter 254 in the form of the unique voltage condition reflective of that crosspoint.

The data formatter 254 serves several purposes. First, it is an encoder. Secondly, it is a first-in-first-out character buffer. Thirdly, it submits data to the modulator. The operation of the data-formatter 254 is monitored and controlled by the controller-timing unit 256.

When a character is depressed on the keypad—being the first character of the seven digit telephone number of the desired Solomon telephone to be accessed—it is stored in the data-formatter 254. Additional characters are stored sequentially. Upon reception of the seventh character, the formatter outputs a string of data to the modulator 255. The modulator has input to it from oscillator 263 a second signal. During system access and initial operations and procedures a signal common to all subscriber transmitters is generated by oscillator 263 and crystal 264. However, after gaining access by keying in the data bypass receiver unit's address and receiving an LED acknowledgement, the oscillator operates on a unique personal frequency dictated by crystal 265. All personal data is communicated via this personal frequency. The data signal strength from the modulator 255 is boosted by amplifier 259 before being applied to antenna 260.

DATA BYPASS UNIT RECEIVER

The telephone based receiver described herein resides in the order of the telephone base station receivers of the cordless telephones popular of late, but one of its primary differences being its universal accessibility. Other differences will be shown as its implementation is described.

In its general categorization it can be said to fall within the field of U.S. Pat. No. 3,535,689, the inventor being H. S. Oden; U.S. Pat. No. 3,476,882, the inventors being J. H. Vogelman, K. Stephenson and B. Fienerman and U.S. Pat. No. 3,449,750, the inventor being G. H. Sweigert.

Technically referred to as the data bypass unit (DBU) receiver, the circuit fits into the Callwriter system as a link between the subscriber and the central office.

Figure 4:
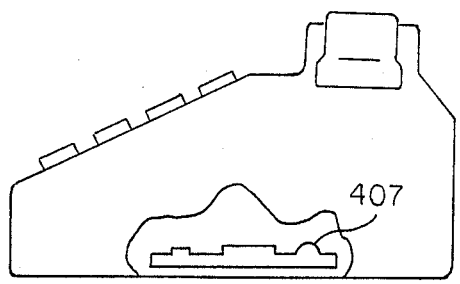
FIG. 4 shows a pushbutton (DTMF) telephone within which is installed a printed circuit of a subscriber open loop monitor used in the local application described in FIGS. 1 and 2.

The circuit can be implemented as a black-box (externally mounted). However, in its integrated-circuit format the DBU receiver 407 is located inside the telephone (FIG. 4).

Thus, being part of the local Callwriter communication system, the circuit is a part of Solomon. Solomon is an acronym for Subscriber Open LOop MONitor.

Billing for the Callwriter System remote functions is direct. This is due to its conventional broadcast technique. The subscriber components are privately owned.

This is not the case with Solomon. Solomon as a whole—telephones, peripheral equipment printed-circuit boards, and hand-held digital data relays—are leased items. These components are the property of the system owner.

Billing for Solomon requires the capabilities of the highly-flexible service features of electronic switching systems (ESS). The billing data is arrived at by monitoring the calling lines through the stored program of the ESS for detection of tones eight through fourteen.

In the event the subscriber loses his monitor and notification is made, the ESS can be programed to block the outgoing calls.

Referring to FIG. 1. The subscriber wishes to utilize Solomon. He is stationed in his automobile 306 at a functional distance from a Solomon telephone. He knows the telephone number (DBU receiver address code) he wishes to access—that is, from which he wishes to originate the call. The originating telephone could be a public telephone 305 (FIG. 1) or any private telephone with Solomon capabilities (FIG. 4). More often, he might wish to originate the call from his home 300 using a keypad appliance 302 in which has been installed a Callwriter System transcriber printed-circuit card. In this case using his peripheral 302 he accesses his own private telephone 301 within his home 300.

Figure 10:
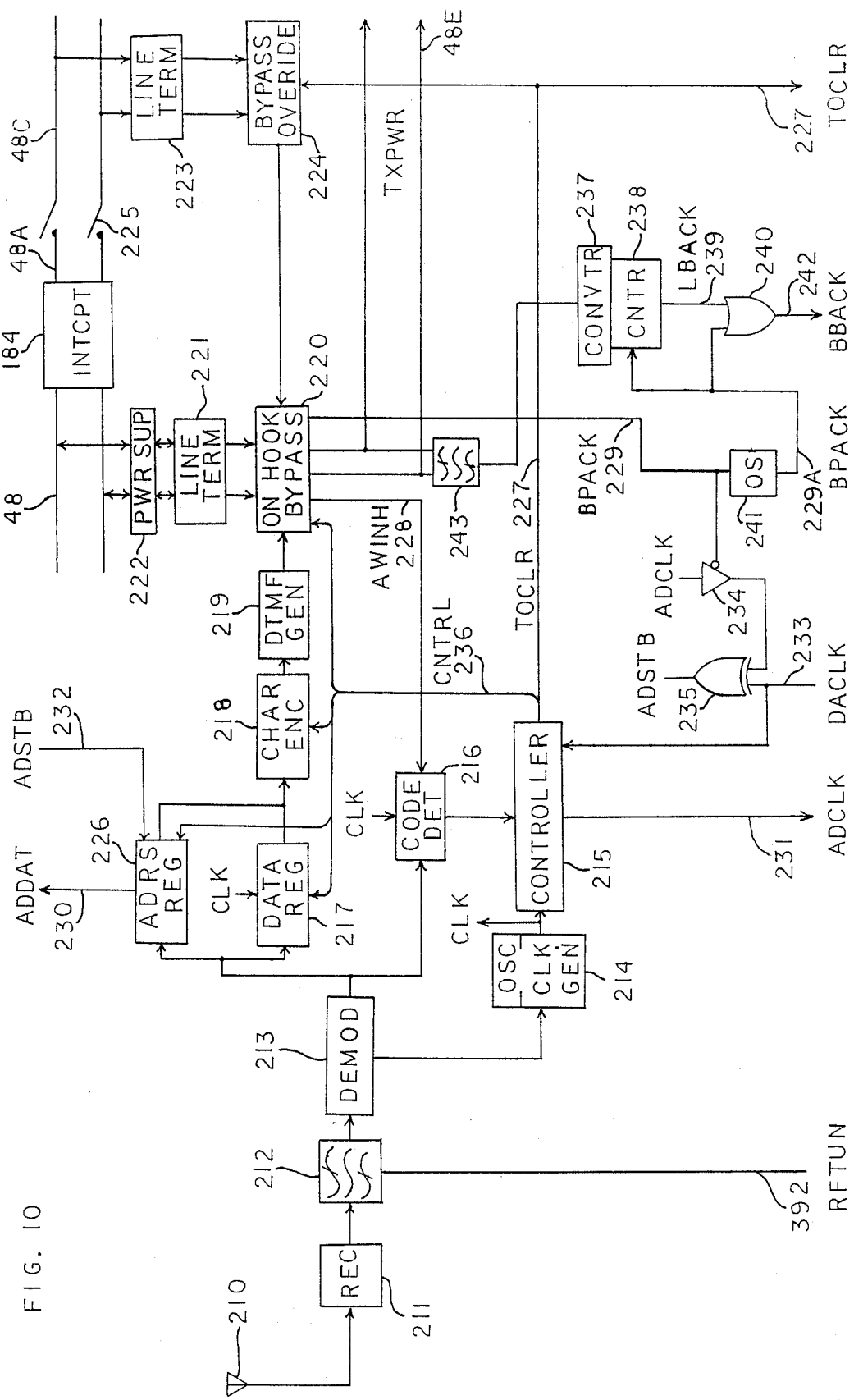
FIG. 10 is a diagram of the telephone-based receiver circuit used in the system of FIGS. 1 and 2 for bypassing the on-hook telephone and inputting data to the telephone system.

Referring now to FIG. 10, the resulting coded ratio frequency signal containing synchronization, data bits and address is picked up by the DBU receiver antenna 210. This signal is input to the circuitry of receiver 211. From the receiver 211 the signal is applied to filter 212. At this point, since no active data transmission is taking place, filter 212 is tuned to its common receive frequency by line RFTUN 392. After undergoing filtering the signal is input to the demodulator 213. The components of the demodulated signal are fed to clock generator 214 and under the control of control lines (CNTRL) 236 to data register 217, address register 226 and code detector 216. The code detector 216 must see its own unique address in order to initialize the controller 215 and permit the control circuitry 215 to enable address register 226 and data register 217 to receive data into their flip-flops. The headers, then, are stripped away from the data. When data is formatted at the originating hand-held transmitter (FIG. 13), each tone transmission in addition to having sychronization bits and this current transaction—the receiver's own address bits added—has automatically appended to it the transmitter's own address also. These are the address bits that are clocked into our FIG. 10 address register 226. The address register is clocked by signal ADSTB (address strobe) 232. ADSTB is in this case a product of the ADCLK 231 signal through tri-state buffer gate 234 and exclusive or gate 235. Gate 234 is transparent as long as BPACK (bypass acknowledge) 229 is low. Address registers 226 consist of a storage capacity of first-in-first-out (FIFO) registers. Behind the sending unit's own address bits—which are stored in the FIFO—comes a single tone character clocked into the data register 217. The data from the data register 217 is reconstructed and registered by character encoder 218 so as to represent the row and column levels which must be seen at the inputs of the dual tone multiple frequency (DTMF) generator 219. Seven data characters—which are in this case actually receiver address characters, since the system is just being addressed—are presented with transmitter address characters preceding until the seventh receiver address (data) character is received by this, the DBU receiver. The data characters, however, representing encoded tones cannot be realized by the system at this time for the unit is still in an on-hook condition.

Once the telephone achieves "bypass" status which it can only do after detecting its own address in code detector 216, then the address write inhibit line (AWINH) 228 from the on-hook bypass 220 to code detector 216 changes states to prevent any further address data being assigned to the register bit positions of the code detector 216 which now has the effect of causing the DBU receiver to lock out other callers. However, the DBU receiver code detector—now that the system is in bypass by virtue of the fact that seven blocks have been received by it—can compare addresses of further incoming blocks to the first bits received and saved just prior to on-hook bypass being initially achieved. Therefore, in addition to the synchronization bits, the code detector must also see incoming addresses matching the established address bits. This first-come-first-served condition has obvious advantages. When the address write inhibit line 228 goes low, indicating the system is again in conventional status, then the address section of code detector 216 can again be written into with data from another subscriber's transmitter.

Figure 14A:
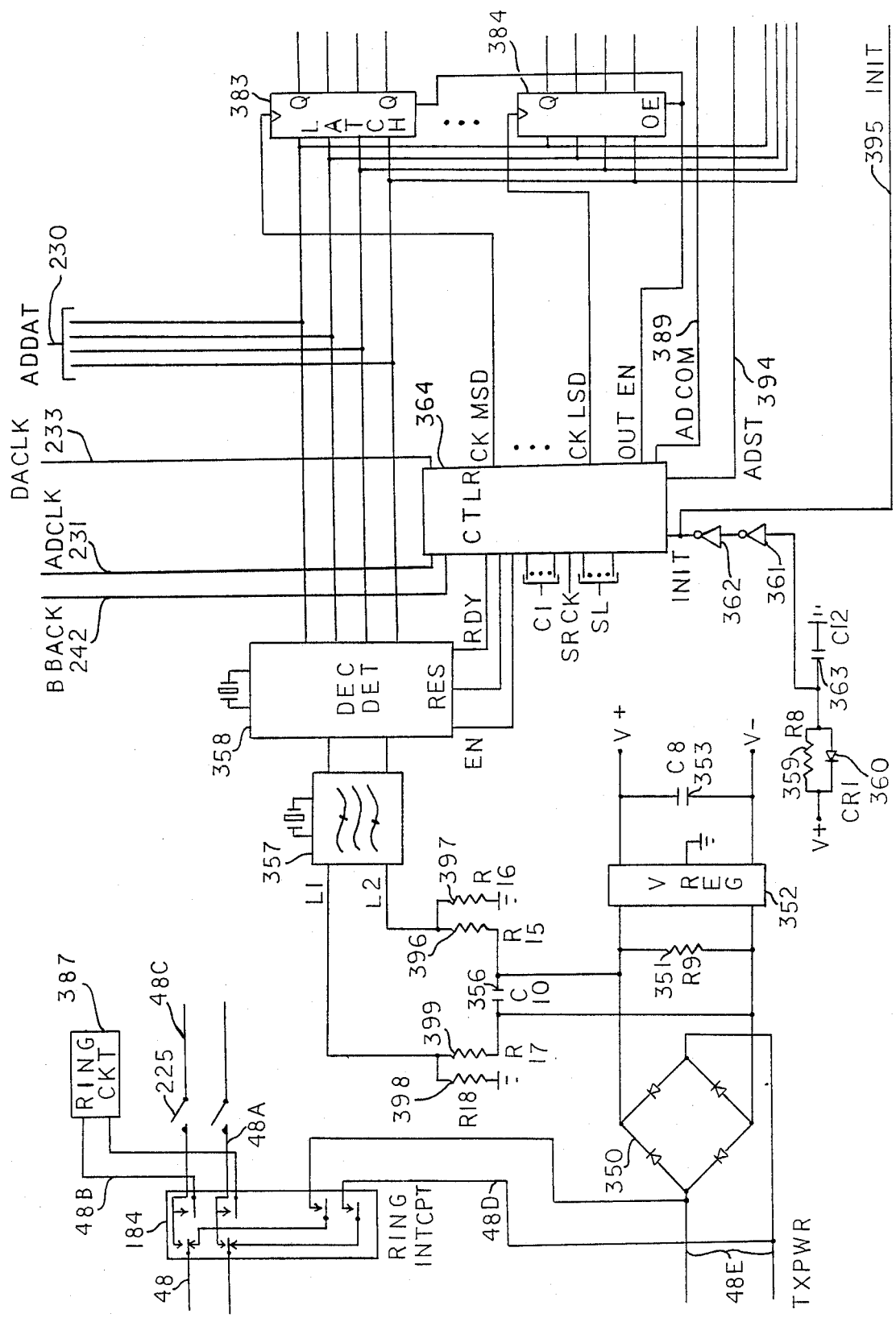
FIG. 14 (A and B) is a diagram of a telephone-based circuit used to accept data from a telephone system bypassing the on-hook condition and transmitting this data aerially from the telephone as described in FIGS. 1 and 2.
Figure 14B:
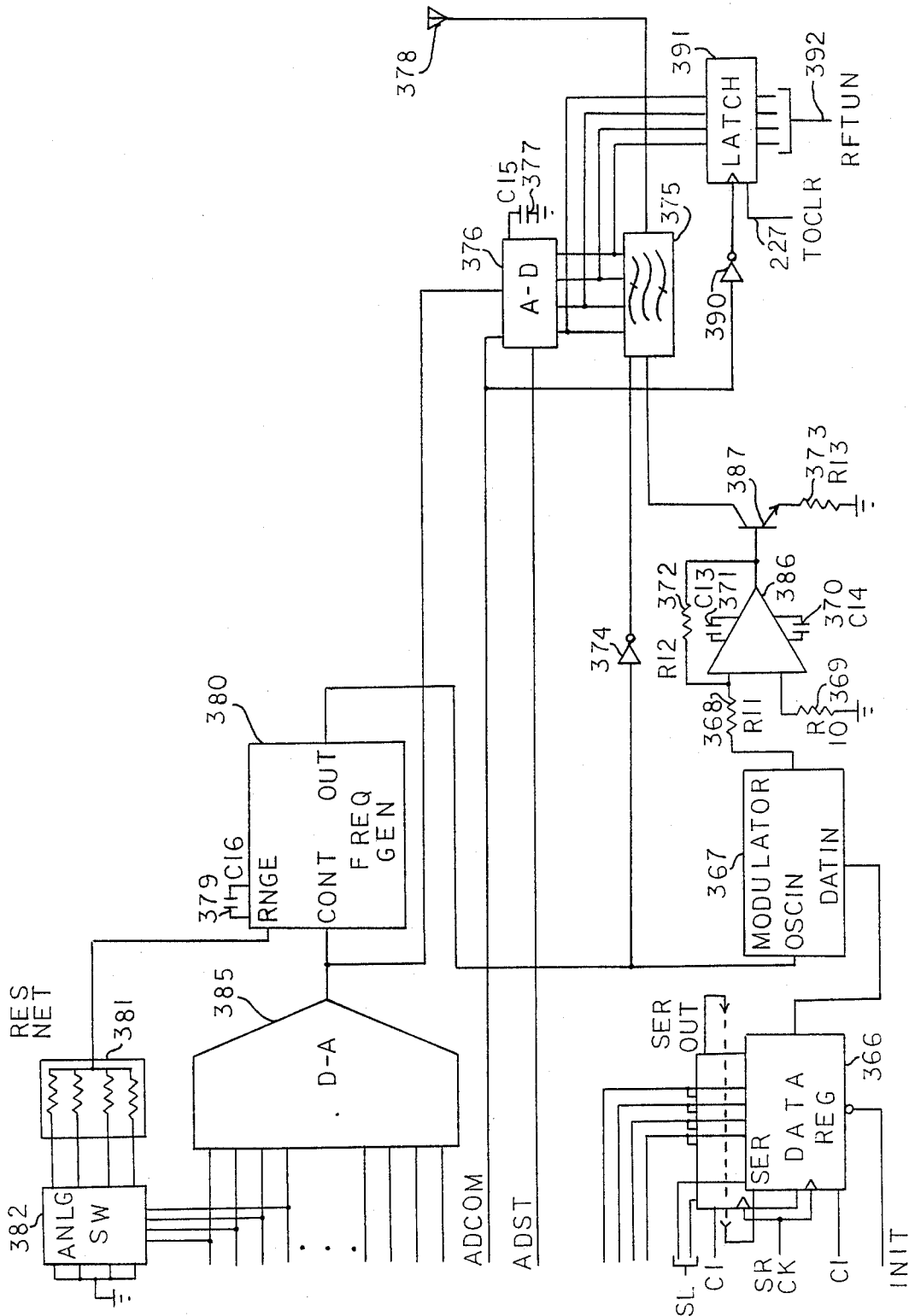

As is, however, on-hook bypass allows power to its associated circuitry through transmit-power (TXPWR) lines 48E. The associated circuitry is the DBU transmitter. The DBU transmitter is installed within the same circuitry area as the DBU receiver and under this particular subscriber condition the power from line 48E serves to power up the transmitter. Also, there is a signal generated from the on-hook bypass unit to one-shot 241. This signal clears counter 238. More pertinently, BPACK 229A signal through dual input or gate 240 can be seen as BBACK (bypass/busy acknowledge) 242 signal. This signal going to the DBU transmitter works in conjunction with the ADCLK (address clock) 231 signal to clock information from FIFO address registers 226 into the transmitter of FIG. 14 via ADDAT (address-data) lines 230. At this point, the ADSTB 232 signal is a product of the ADCLK signal 231 which is conveyed through the transmitter controller 364 and appears at exclusive-or gate 235 as DACLK 233. When this transfer of addresses is complete to the DBU transmitter of FIG. 14 and off-hook (access) to the telephone system is achieved, one use the transmitter will make of these address data from latch 391 is to establish the signal needed to tune filter 212 via RFTUN 392 to set up our receiver in order that it may receive further incoming signals (true data) on a subscriber's private frequency. The data register 217 accepts this data which is submitted to the character encoder 218. As was stated earlier, via the character encoder this data is submitted to the DTMF generator. The digitally synthesized tones are presented to the on-hook bypass circuit 220. The on-hook bypass is essentially a logic-driven relay circuit. Upon receipt of the enabling pulse, which must originate from the control circuitry 215, the on-hook bypass has effected an off-hook condition thereby allowing the DBU receiver to gain access to telephone lines 48 and is now able to transmit the dual tones. Another purpose of the address data transfer to its transmitter counterpart is so that the subscriber will receive a visual (LED) display on his personal transmitter to indicate that he has gained access to the system, at which time he may proceed to dial in the numbers (tones) of the far-end telephone he wishes to reach. When the seventh digit is transmitted as a tone after being output from data register 217 and ultimately DTMF generator 219, then the DBU receiver automatically outputs a second address, this time in rapid succession. These tones originate as serial data from address register 226. This means that fourteen tones are generated—seven mutually input for the number called, which triggers seven additional tones automatically input to the system and representing the subscriber's mobile transmitter. The second set of seven digits is put into the system for the purpose of identifying and billing the caller. The caller has no control over them.

In the event the system responds with a busy signal, filter 243 passes the tone on to the a.c. converter 237 which operates in conjunction with pulse counter 238 which has been previously cleared to provide an output signal LBACK (line-busy acknowledge) 239. Through dual input or gate 240, this signal, seen again as BBACK 242, loads as before our mobile transmitter's address to the DBU transmitter for sending a signal that will again light the VLED on the subscriber's mobile transmitter. This second indication, then, is to inform the subscriber that the number on the far end is busy and that he need not attempt further entry via his keypad.

There are other circuits sitting on the telephone lines 48. The power supply 222 sits astride telephone lines 48 and supplies constant power to the DBU receiver. The lines 48 see the necessary impedance through line termination 221. Given a situation wherein the subscriber has at his privilege the availability of Solomon, there is a stipulation with this privilege. Another caller wishing to access the telephone lines 48 by and for cmventional means may do so merely by lifting the handset and allowing the voltage on the lineside (48A) of hookswitch 225 to activate the bypass override 224 which results in deactivation of the on-hook bypass 220. This effectively shuts down any data transmission that might be in progress. Line termination 223 satisfies network impedance requirements. It can be seen that data transmission bypasses the intercept circuit 184, same circuit having the aforementioned purpose of eleminating the telephone ring when it is desirable to discretely receive (input) data transmitted from the far end. Again, concerning the bypass override 224, it can be seen that it has an additional control line associated with its operation. If the detect circuitry 216 does not receive a synchronization character within a predetermined period of time, this line transmits a time-out clear signal (TOCLR) 227 to the bypass override 224 permitting it to disable the on-hook bypass 220 restoring the telephone to its conventional status. The likely event of abandoned transmissions dictate such a precaution. This same time-out clear signal is also used to allow filter 212 to be returned to system-wide access mode by virtue of the clearing of latch 391, FIG. 14, through TOCLR 227.

DIGITAL DATA RELAY

Figure 12A:
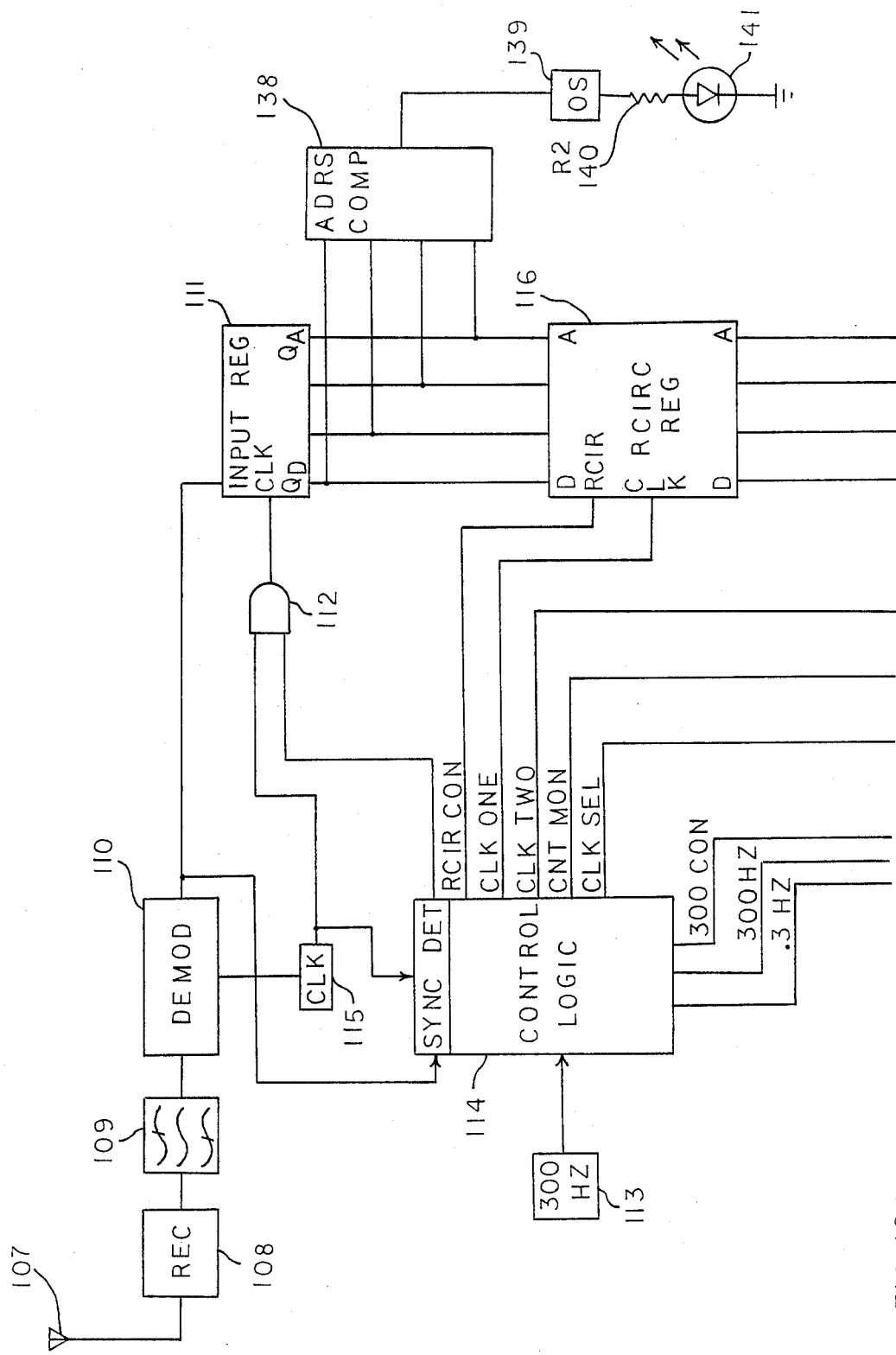
FIG. 12 (A and B) is a circuit diagram of a subscriber's portable digital data relay used in the systems of FIGS. 1, 2 and 3 to receive, store, display and ultimately transcribe data to a permanent storage device.
Figure 12:
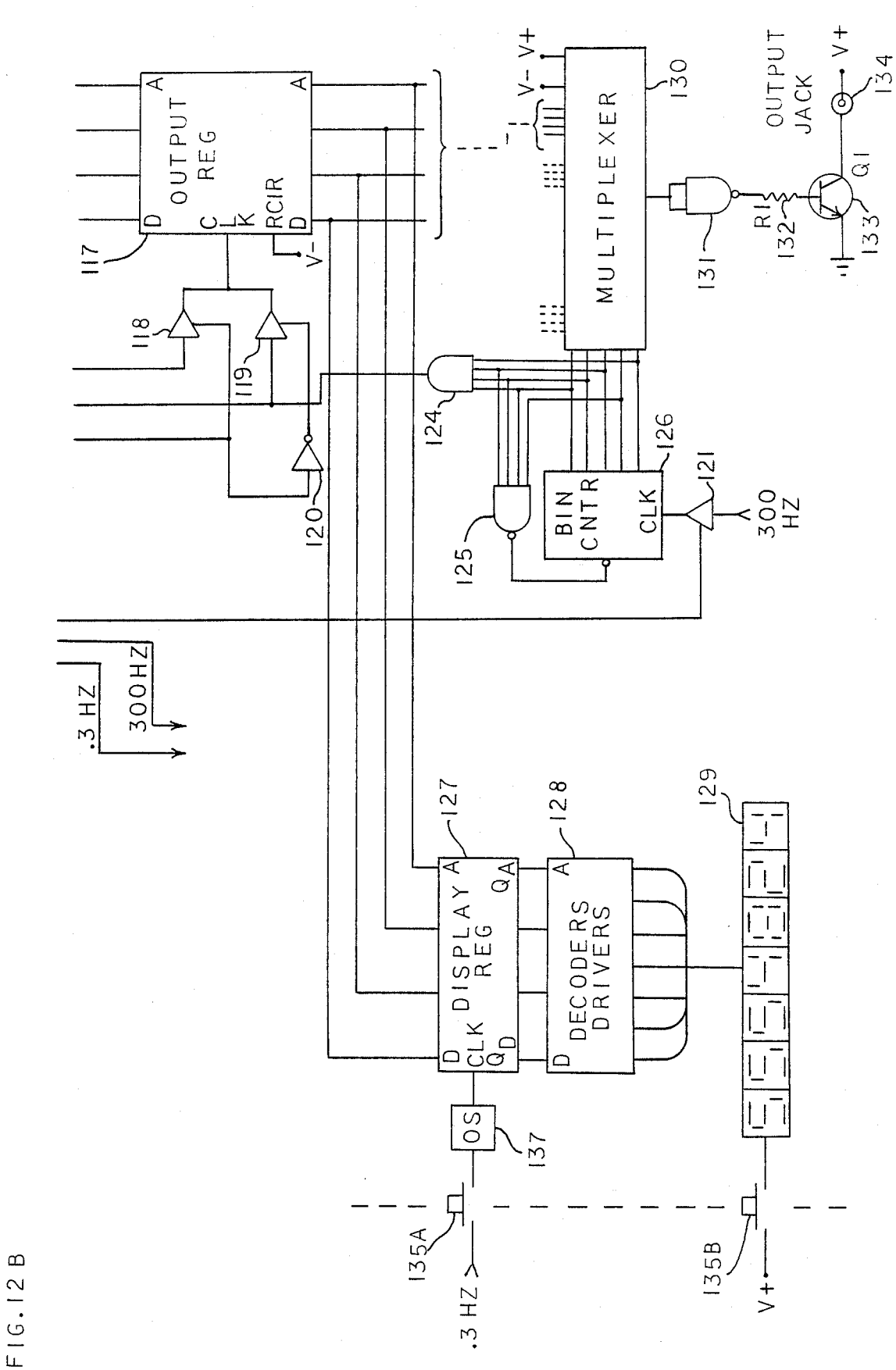

The transcriber, which is a vital link and a major component in the Callwriter system is diagrammed in FIG. 12. Functionally, it is the digital data relay (DDR).

Figure 2:
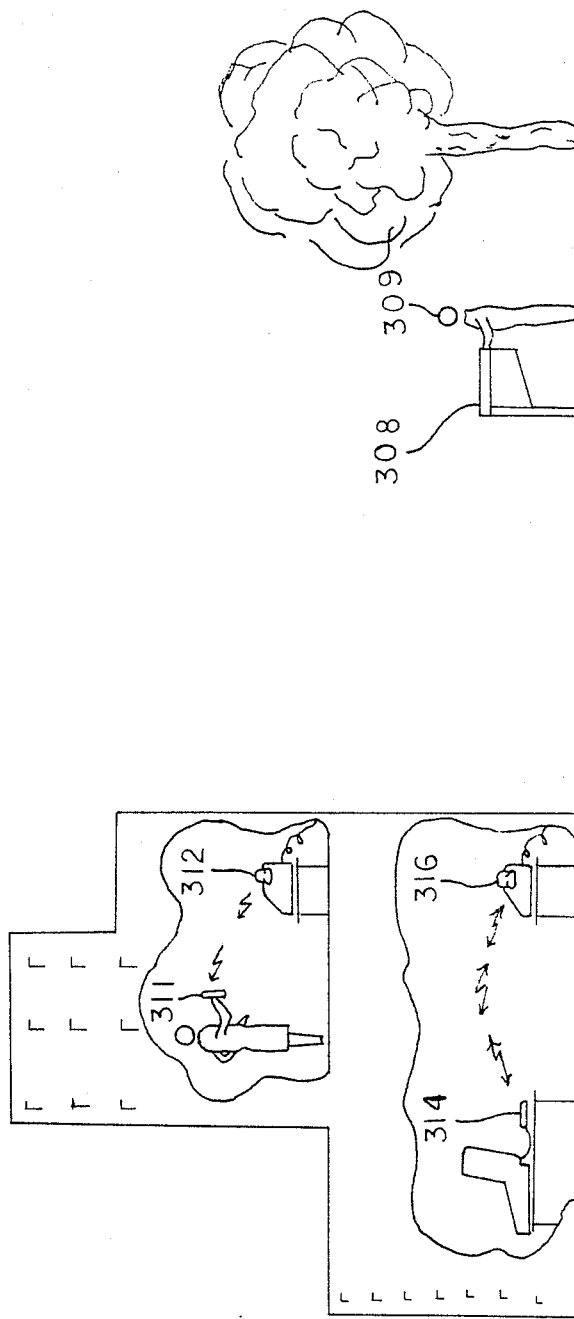
FIG. 2 is a further illustration of the local application of the system of FIG. 1 with an emphasis on the data processing units (or data bypass units) as system links.
Figure 3:
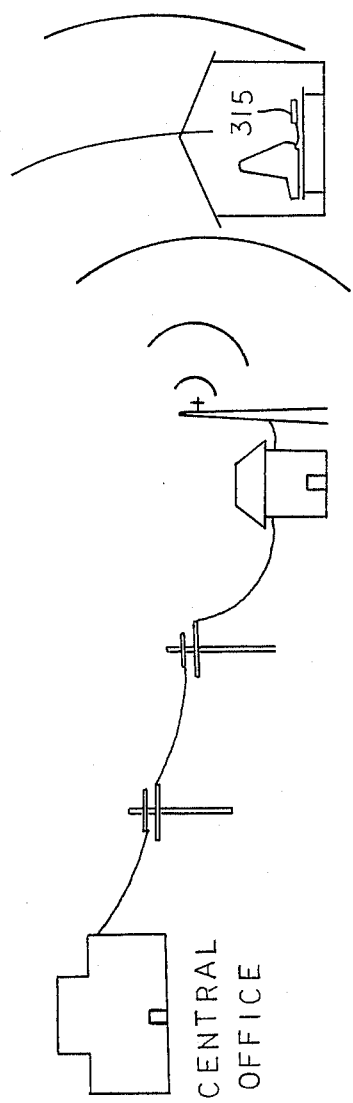
FIG. 3 is an illustration of the remote application of the telephonic communication system pertinent to the present invention.
Figure 3:
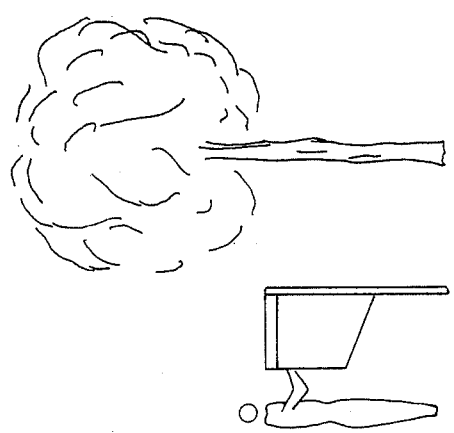

The DDR is depicted in some of its implementative and operational applications in FIG. 2 unit 314 and FIG. 3 unit 315. However, FIG. 2 unit 311 and FIG. 1 setting 302 and 306 in the general scope encompasses the DDR also.

The DDR functions as both a remote and a local (Solomon) device.

In observation of FIG. 12, the radio-frequency waves generated by either the remote transmitting station or the local transmitter are picked up by the antenna 107. This incoming signal is conducted into the receiver 108. From the receiver 108, this signal is input to filter 109. The selected output is applied to demodulator 110 where it is processed. In undergoing processing by the demodulator 110 the digital components of the signal are extracted. The output is comprised of a serial string of pulses. These digital components are data used to compose the seven digit groups sent by the originating messenger and the same data which are ultimately to be relayed to the output jack 134 and the seven segment display 129. However, preceding these data are unique address data. This unique seven bit code is constantly sought after or monitored. As the circuit is operating at its system frequency and digital data starts to appear at the output of demodulator 110, this data has two possible destinations. One destination is the serial-in-parallel-out shift register 111. The second possible destination for data is the input terminal of the synchronization detector which is part of the control logic 114.

No data can be serially input to the serial to parallel input register 111 except upon the clocking signal. This clocking signal is derived by anding two separate signals through and gate 112. The two signals themselves originate from the system clock 115 and the output of the synchronization detection circuit which is in fact part of the control logic 114. The synchronization timing is also supplied by the system clock 115.

When the leading bits of address data clocked into the synchronization detector 114 are identified, output pulses are generated, as each receiver is upon manufacture appointed its address in firmware. These pulses generated as a result of the match-up along with the system clock 115 pulse then allows data on the incoming data line to be input to the input register 111.

This serial-to-parallel register 111 holds twenty-eight (28) bits of data representing seven four bit digits. After the twenty-eighth bit is written on the count of twenty-eight the recirculate control line of control logic 114 is taken low and the data is written into the recirculate shift register 116 with its clock pulse.

Even as data is made available to the recirculating shift register, it is made available also to address comparator 138. While the recirculating shift register 116 is meant to hold valid data which is ultimately to be presented to the output for more permanent storage, the data going to the address comparator 138 is of consequence only if it is the binary representation of its very own address. Its own address is firmware written and these are the address bits that the comparator 138 wants to see. These address bits are binarily located in the incoming pulse train at the data position and will for all practical purposes appear to be data. The origin of these particular bits however is quite different. From a standpoint of practical operation these particular address bits will originate from within the physical confines of the telephone itself which is transmitting to this particular DDR. Bear in mind from descriptions given elsewhere in this documentation that the DDR receiver will at times be constructed with a transmitter as well. Therefore, when the user transmits to a Solomon telephone as in the case of FIG. 1, case 306 to unit 305, he will receive (assuming the line is not being utilized) an acknowledgement of "on hook bypass established". He will receive this acknowledgement from the data bypass unit (DBU) receiver shown in FIG. 10. This DBU receiver will through FIG. 10, transmit-power (TXPWR) lines 48E and ADDAT 230 send the transmitting subscriber his own address back. This address is passed to the DBU transmitter shown in FIG. 14 which is itself also located inside the same telephone. Even though these address bits occupy data positions in this particular case and cause the VLED (FIG. 12) 141 to momentarily light informing the subscriber to start dialing, these bits are not bonafide data as such but are really control bits in comparator 138. Seeing its address and realizing a match-up, the comparator 138 outputs a pulse to one-shot 139 which through resistor R2 140 causes VLED 141 to momentarily light. This VLED 141 is shown again in the lower left-hand corner of the subscriber hand-held DDR in FIG. 8. Even though the VLED will light as a result of the DDR having received control bits, there are instances when the VLED 141 will light after the DDR presently discussed has received bonafide data instead of control bits. One such case among others is when the far-end subscriber wishes to inform the unit's holder that bulk data transmission is soon to follow and therefore this same DDR should be connected to a mass storage device to prevent loss of bonafide data resulting from overwriting.

To follow the acquisition of data we must go back to the output of our input register 111 where we saw the data being written into the recirculating shift registers 116 with their clock pulse.

The recirculating shift registers 116 are constructed seven deep and accomodates data four bits wide. Depending on the user's anticipated need, this group of seven shift registers are four bits by n bits (i.e. 4×256).

When data is not being written, the recirculate control (RCIR CON) is let high and the register 116 returns to recirculating the data at its clock speed. Data recirculate is inhibited during writing into this register 116. Since the clocks (CLK ONE) of this register bank 116 are all common, the seven character words will be recirculated in unison making available all twenty-eight bits to the output terminals simultaneously. New data is presented to outputs A, B, C and D during each clock pulse.

The control logic 114 which consists of basically a collection of counters and flip-flops has in addition to the demodulated output and clock signal another signal supplied to it. This signal is a 300 hertz signal input from oscillator 113. This 300 hertz signal also appears at the input of tri-state buffer 121.

Architecturally the output shift register 117 conforms with recirculating shift register 116. The recirculate of output shift register 117 is tied low inhibiting recirculate on this register. Output shift register 117 will always run at one of two clock speeds. At the higher clock speed—which is the same speed as its preceding recirculating shift register 116—register 117 constantly accepts data from register 116 and makes available data at its output terminals A, B, C and D with each clock pulse. This higher clock rate which originates from the control logic 114 on clock two (CLK TWO) output line is transmitted through tri-state buffer 118. Tri-state buffer 118 and 119 along with inverter 120 form a one-of-two line data selection circuit. With the data selection control (CLK SEL) line held high, tri-state buffer 118 is selected allowing the higher clock speed to drive the output register 117. Assuming a word capacity of 256 words, upon reaching the count of 256 the CLK SEL line is switched low, this time allowing the clock signal present at tri-state buffer 119 to drive output register 117. Outputs A, B, C and D of this register 117, which are incremented with each clock pulse, are made available to display register 127 and to a thirty to one line multiplexer (MUX 130). MUX 130 has its input to output inverted. The thirty bits of MUX 130 consists of the single fixed start bit which is tied low, twenty-eight data bits from the output shift register 117 and a single fixed stop bit which is tied high. MUX 130 has its select inputs driven by binary counter 126 which is itself driven by tri-state buffer 121. The aforementioned 300 hertz signal is applied to the input of counter 126 through buffer 121 which is controlled by the 300 hertz control line (300 CON). 300 CON is set high when 256 words have fallen through the data registers to the outputs of shift register 117. This control line being high then allows MUX 130 through binary counter 126 to sequence. With the output jack at mark (current) status, the first bit through the MUX 130 will drive the output of nand gate 131 low. Coupled through R1 132 this low signal will turn off transistor Q1 133 giving a no current (start) at output jack 134. Subsequent data is multiplexed at a rate of 300 bits per second. Upon reaching the twenty-ninth count, the count detect circuitry will transmit a high signal to the output of four input and gate 124. The count detect circuitry consists of and gate 124, nand gate 125 and buffer 119 which work together to monitor the output of binary counter 126. Thus, the twenty-ninth count gives a high signal at the output of four input and gate 124 which is input to the control logic via the count monitor (CNT MON) line. After the twenty-ninth pulse, the contents of output shift register 117 have been incremented. The counter continues to run and is cleared or reset to zero upon the attempt of the thirtieth bit. This incrementation ultimately results in a MUX 130 high input which translates into a stop (current) bit. When 256 incrementations of output shift register 117 have occured, which empties output register 117, the clock of register 117 is again permitted to run after register 116 capturing more data. Periodically there may be a desire to manually access the data in the Callwriter DDR. This interrogation of the output register 117 can be accomplished by pressing display push-button 135. Push-button 135A permits a 0.3 hertz signal to be applied to the clock input of display register 127 via a one-shot monostable 137. This incidental data is decoded by decoder-driver 128 and displayed on seven-segment display 129 whose blanking control is controlled by a second set of contacts common to the display push-button and labled 135B.

DATA BYPASS UNIT—TRANSMITTER

Figure 5:
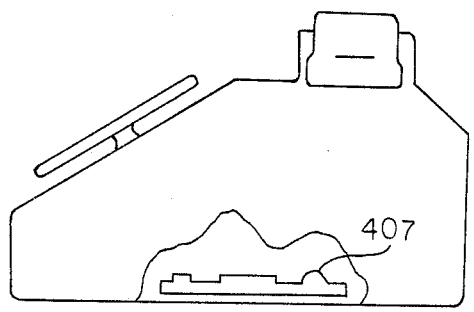
FIG. 5 shows a pulse-type telephone within which is installed a printed circuit of a subscriber open loop monitor used in the local application described in FIGS. 1 and 2.

This facet of the invention relates to the base station transmitter portion of the cordless type telephones. The unit, therefore, is a transmitter capable of receiving data from a distant telephone through its telephone lines and retransmitting this data to a designated receiver. Unlike the base unit of the cordless type telephones, this unit—called the data bypass unit transmitter (DBU transmitter)—can be programmed to transmit digital data to any subscriber receiver within a certain radius. This corresponding subscriber receiver is called a digital data relay (or DDR). The receiver itself is covered in other parts of this documentation. This (our current subject) transmitter is black-boxed at the telephone. However, in its integrated form it is constructed as a printed-circuit card allowing permanent installation within a Solomon telephone. Solomon is an acronym for Subscriber Open LOop MONitor. The DBU transmitter 407 in its printed-circuit card operation format is depicted in FIGS. 4 and 5. While these depictions appear as private telephone situations, the DBU transmitter can be installed inside public telephones also. In some cases it may not be desirable to have a telephone included at all. What is necessary, of course, is that there be a subscriber line available. In addition to FIGS. 4 and 5 the DBU transmitter is depicted in various implementary settings in FIG. 1 cases 301 and 305 and FIG. 2 cases 312 and 316. It has a range of typically 600 feet.

The DBU transmitter can transmit information which has been input to it from the far end (caller's end) by two methods. One of these two methods employed at the far end can be that of using the hand-held or peripheral-bound subscriber transmitter diagrammed in FIG. 13. The second method of communication with the DBU transmitter is that method whereby the caller contacts the DBU from a rotary-dial or touch-tone telephone.

For explanatory purposes we will assume the caller is utiliziing a dual tone multiple frequency (DTMF) type dial mechanism and will therefore show the DTMF portion of the data bypass circuitry for processing DTMF. The circuitry for rotary-pulse processing is not shown in FIG. 14 and would effect basically the input (front-end) only in the figure. The rotary-pulse detection circuitry would appear as straightforward pulse counting hardware much of which is already available in pre-packaged format or could be constructed from easily obtained components. Nevertheless, the DBU transmitter requires an interface which is both DTMF and rotary-pulse sensitive and the rotary-pulse sensitive interface is illustrated in FIG. 11 and detailed in other parts of this documentation. This interface along with the DTMF sensitive interface makes up a better part of the circuitry of component number 184 in FIG. 14 which is labeled as the "ring intercept" unit. Having this ring-intercept feature, the Solomon telephone inside which the DBU has been installed will not have to ring to enable the transmission circuitry to operate. However, the DBU is powered from the telephone lines. The DBU transmitter's address is in actuality the telephone number of the telephone in which it is installed or merely the line number as would be the case when the DBU has been simply placed at the end of a subscriber's telephone line.

Referring to FIG. 2, the caller 309 is utilizing touch-tone telephone 308. He knows the telephone number of telephone 312 and that this same telephone 312 is a Solomon telephone. He therefore dials in the seven digits of telephone number 312. Within a specified time-period he dials another single digit which will actually head-off the ring that would normally sound from telephone 312. Referring again to FIG. 14, this single digit which enables the caller to bypass ringing circuit 387 is dependant on the telephone being on-hook and hook-switch 225 therefore being open. This dialing of the single digit brings us to the point in FIG. 14 where we can process the data input thereafter, for what it does technically is give us access to the DBU transmitter. This single digit causes the circuitry of ring intercept 184 to connect the telephone lines 48 to interior lines 48D.

When the interior lines 48D are connected to the telephone lines 48 the circuit is powered-up. The line power is conditioned by full wave bridge rectifier 350, bypass capacitor C8 353 and voltage regulator and divider 352. Therefore, when V+ is applied to the supply end of R8 359 and CR1 360 a pulse is generated by these two components along with their associated components C12 363, inverter 361 and inverter 362. The pulse generated by this circuit has a twofold purpose. It initializes the control circuitry 364 via INIT line 395 resetting all input and output lines to the "originate" state. Secondly, this initializing pulse serves to clear the output data registers 366 of any residual data which might have been left over from a previous operation. The occurance and duration of this initializing pulse plus the resetting signal from controller 364 to decoder-detector 358 is such that it has accomplished its purpose before the caller has proceeded to input the second set of seven digits (dual tones) into the system. Since the circuitry is now connected to telephone lines 48 and the proper line impedance is established by components R9 351 and C10 356, the tone signals are available via input resistor combinations R15 396, R16 397, R17 399 and R18 398 to lines L1 and L2 and therefrom DTMF filter 357. The filter 357 devides the dual tones into their high and low groups with the outputs being pulses. These pulses are input via their respective lines to decoder-detector 358. This inputting is made possible by the high signal which was applied to the enable pin of the decoder-detector 358 when the controller 364 input-output pins responded to initialization. This decoder-detector 358 operates on DTMF frequencies only and the results of this discrimination is such that a code is output which is a binary representation of the dual tone which was put on the line by the caller. This code is latched at the output of the decoder-detector 358 and a signal is given by the ready line of the decoder-detector 358 to the controller 364 informing the controller that a single digit has been input to the system. Consequently, the controller generates a clock pulse to the most-significant digit latch 383 storing the bits and follows by resetting the decoder-detector 358 and momentarily lowering the enable line to allow the decoder-detector to prepare for acceptance of another digit. The latch is one of seven such latches. Likewise, the controller enables the parallel to serial data registers 366 to capture these same bits. At this point the system is, more accurately, in the process of storing address bits as these bits and the bits of the following six digits will be interpreted as the address of the DDR to which the true data will be transmitted. Also, the shift registers actually consist of two different types of registers. The address bits themselves are written into recirculating registers whereas the data bits are written into the registers from which to be read straightforwardly. When the seventh digit is latched into the least-significant digit latch 384 the controller activates the output enable lines of the latches. The output lines of the most-significant digit latch are connected to the control lines of analog switch 382. They are also connected to the most-significant digit of digital-to-analog converter 385. The remaining digits from the latches are also connected to digital-to-analog converter 385. The internally referenced digital-to-analog (D-A) converter 385 accomodates four-bit binary code groups. The digital magnitude of each telephone number called is converted to its corresponding analog representation. This analog output is connected to A-D converter 376 and frequency generator 380.

Frequency generator 380 has its frequency range controlled by the magnitude of the analog voltage from D-A converter 385, capacitor C16 379, and the resistance at the range input. The resistance at the range input of frequency generator 380 is determined by resistor film network 381 which is programed by digitally controlled analog switch 382. The resulting frequency is applied to schmitt-trigger inverter 374 and to the oscillator input (OSCIN) of modulator 367.

It should be reiterated at this point that the data which is functioning now is address data—that is, data which is used to set up the system to communicate with a specific subscriber receiver or DDR. Recall, the seven address digits are latched. Thus, the additional digits are not latched because they are considered to be data to be transmitted as just that: data. These digits, just as were the address digits are, however, input to data registers 366 whereupon the receipt of the seventh digit will cause a start signal to be given from the controller 364 on the analog-to-digital start line (ADST) 394. The start signal begins the conversion process of A-D converter 376 whose timing is a direct function of capacitor C15 377. Upon completion of the A-D conversion a signal is sent to the controller 364 via ADCOM line 389 initializing transmission. This signal also latches the analog converted to digital signal into latch 391 via inverter 390. A-D converter 376 and inverter 374 are used to tune programmable filter 375. The data that are in the parallel-to-serial data registers 366 are submitted to the modulator 367 data input (DATIN). The destination address code precedes the data. The resulting modulated signal is then input to wide-band amplifier 386 along with its associated amplifier components R10 369, R11 368, R12 372, C13 371 and C14 370. The signal strength is further boosted by transistor 387 and its associated emitter resistor R13 373.

The signal transmitted from antenna 378, then, is a signal whose frequency is proportional to the numeric value of the destination address and contains its address code.

The destination of the signal in this case is the DDR selected by the caller who is originating or calling from a pushbutton tone type telephone. However, there is circuitry within this, the DBU transmitter, which will accomodate data which is orignated nearby, in which case the caller chooses not to use a telephone in the direct manner to input data to Solomon but instead is stationed hundreds of feet from any Solomon telephone and inputs data using his DDR transmitter. Such a case can be depicted in FIG. 1 condition 306.

When the subscriber accesses Solomon using his or her subscriber transmitter, the receiver diagrammed in FIG. 10 picks up his signal. The DBU transmitter shown in FIG. 14 and the DBU receiver shown in FIG. 10 are commonly configured in their physical proximity, since their functions are interrelated. Hence, these corresponding circuits have some of their functions hard-wired together. Therefore, the receiver of FIG. 10 having received the address information in its address register 226 and achieving on-hook bypass status outputs an initializing control signal on its BBACK 242 line to our FIG. 14 controller 364 (BBACK 242 in this case originates as BPACK 229). The DBU transmitter having been powered up through TXPWR (transmit-power) lines 48E and is now responsive to ADCLK 231 signal begins to clock in data from its associated receiver via DACLK 233 to this the transmitter section on lines ADDAT (address-data) 230. Address clock (ADCLK) is fed through the controller 364 and emerges as DACLK. All information under this condition, however, is address information. When the transmitter receives the appropriate number of address characters it will respond just as it did to the data characters—not distinguishing between the two—by transmitting the information.

The information transmitted is in the private unique frequency of the intended subscriber's (FIG. 12) receiver only. The digital information earlier latched in latch 391 is output to the associated Solomon telephone receiver's tunable filter 212 (FIG. 10) via lines RFTUN 392.

This transmission—as opposed to routine transmissions—is for the sender and not for an intended far-end subscriber. The signal is returned to the sender to inform him or her that they have gained access to Solomon.

The TOCLR 227 (time-out clear) signal is an automatic response generated by the absence of data and the occurance of TOCLR 227 returns the associated receiver circuit filter 212 to its common system-wide access mode.

Figure 15:
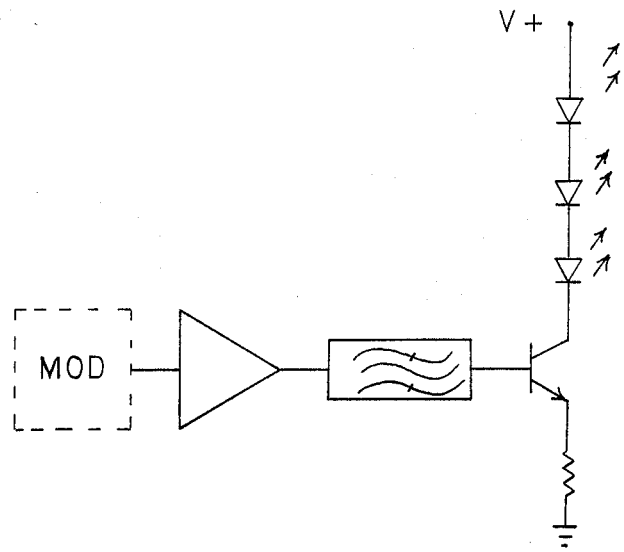
FIG. 15 is a photoelectric version of the telephone-based transmitter of FIG. 14.
Figure 16:
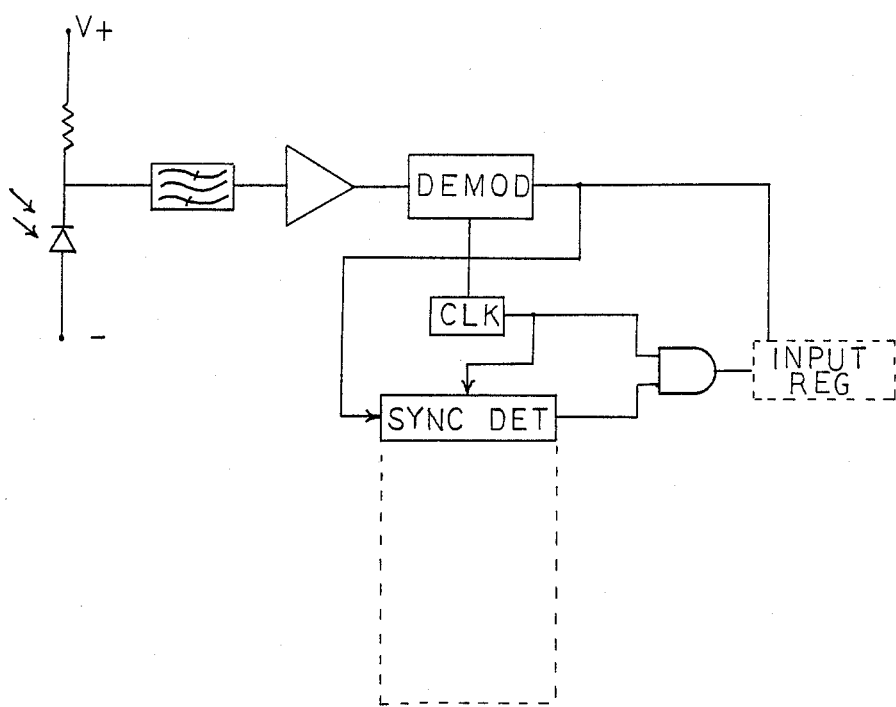
FIG. 16 is a photoelectric version of the subscriber data unit described in FIG. 12.
Figure 17:
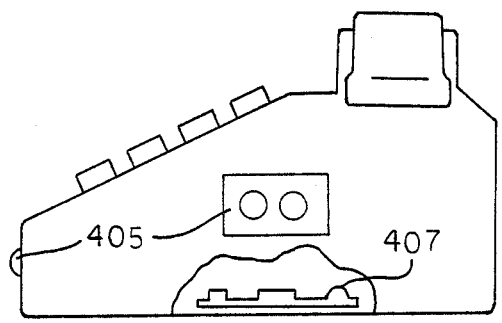
FIG. 17 shows a photoelectric version of the local system telephones described in FIGS. 2, 4 and 5.

FIGS. 15, 16 and 17 illustrate light-sensitive transmitting and receiving Solomon implements. They show part of the DBU transmitter, subscriber receiver and the telephone respectively. Although not shown, the associated hardware is also constructed as is correspondingly necessary to facilitate communication. For instance, the DBU receiver (optical) must have photodetective capabilities. The optical sensors and transducers 405 (FIG. 17) can be visible or infra-red in nature.

It is shown in the accompanying descriptive material that data seven characters long are accomodated. This data can be phone numbers—in which case the system would be used in its most inefficient manner—as opposed to the bulk transferring of data. It can be easily seen, however, that in its general framework the system accomodates characters four bits wide. As such, the system can also accomodate characters eight bits wide which could be transmitted to a distant computer as a vector address. It could accomodate a program-control instruction of twelve or sixteen bits wide. For that matter, it could furthermore be a character string of indeterminate length.

Another point can be expanded upon. It is known in the science of telephony that radio-frequency signals from telephones can be connected through capacitors to utility power lines. While that convention is not a fixture in this system, when the structural environment makes this technique expedient, that expediency will be realized but inclusively in the context of the communication system set forth as a whole.

Again, it is common knowledge among those familiar with the science that analog signals can be quantized, transmitted and decoded to obtain an analogical reconstruction of the original signal. With its bitexpandable architecture and its highly-present transmission capability, the Solomon system was designed with the potential to realize this advantage.

I claim:

1. A landline telephone communication system comprising a plurality of subscriber loops, said loops allowing a telephone to be connected to telephone lines via conventional telephone connection means and wherein said telephone has an automatic telephone message interception means attached which can, upon detection of a coded signal sent from a calling telephone, inhibit audible ringing of called telephone instrument engaging said message interception means, and upon lifting of the handset of said called telephone instrument disengaging said message interception means and restoring the availability of the ordinary use of said called telephone instrument, comprising:

- a modularized telephone-based data relay station residing within said telephone instrument and connected to said message interception means for providing a plurality of signal response means;
- line receiver means residing within said telephone-based data relay station responsive to dial signal messages which a caller may send over said telephone lines;
- telephone-based storage means residing within said telephone-based data relay station consisting of digital electronic memory for storing of said dial signals transmitted from said caller;
- formatting means residing within said telephone-based data relay station for arranging said dial signals from said caller into a unique digital format suitable for system application;
- telephone-based transmission means residing within said telephone-based data relay station for aerially transmitting via radio-frequency said digitally formatted signals to a plurality of addressable mobile subscriber input/output data transcribers;
- first automatic self-tuning means residing within said telephone-based data relay station whereby said telephone-based transmission means has capability to automatically tune itself to the operating frequency of any one of a plurality of said addressable mobile subscriber input/output data transcribers upon realizing a coded address sent to said telephone-based data relay station by said caller;
- base station receiver means residing within said telephone-based data relay station providing means for receiving transmitted signals from said mobile subscriber input/output data transcribing devices;
- second automatic self-tuning means residing within said telephone-based data relay station for accepting system coded digitally formatted radio frequency signals from said mobile subscriber input/output data transcribers, said signals from said input/output data transcribers being first transmitted to said telephone-based data relay station on a common system-wide access frequency and upon gaining of access to said telephone lines said second automatically self-tuning means accepts data to be transmitted by said mobile subscriber input/output data transcribing device on said mobile subscriber's input/output data transcribing device's own private frequency;
- line access means residing within said telephone-based data relay station for the purpose of effecting an off-hook condition of said telephone instrument connected to said telephone line, when it is desired by said mobile subscriber using said mobile subscriber input/output data transcribers to input data through the telephone system;
- portable receiver means residing within said mobile subscriber input/output data transcribing devices wherein a plurality of said mobile subscriber input/output data transcribing devices may acquire said radio frequency digitally formatted signals transmitted by said telephone-based transmission means being located within said telephone-based data relay station;
- portable transmitting means residing within said mobile subscriber input/output data transcribing devices wherein a plurality of said mobile subscriber input/output data transcribing devices may transmit radio frequency digitally formatted signals to said base-station receiver means for the purpose of gaining telephone line access, and inputting subsequent data from said mobile subscriber input/output data transcriber devices;
- portable mass memory storage means residing within said mobile subscriber input/output data transcribing devices comprising recirculating shift registers for the transcribing of data received at said portable receiver means in a volume suitable for accommodating a data controlled device data control function;
- output means for immediately and continuously throughputting said data received at said portable receiver means, making it available at said mobile subscriber input/output data transcriber output jack for writing to a hardcopy device; and
- remote control means comprising matrix-switched format incorporated within said mobile subscriber input/output data transcribing devices for subscriber inputting and application of line access signals and data signals transmittable by said portable transmitting means.

2. The system according to claim 1 wherein said data output from said data transcriber output jack is in serial binary format.

3. The system according to claim 1 wherein said matrix-switched format of said remote control means incorporated within said data transcribing devices is a push-button keypad.

4. The system according to claim 1 wherein said dial signals sent over said telephone lines to said telephone-based data relay station are dual-tone-multiple-frequencies.

5. The system according to claim 1, wherein said mobile subscriber input/output data transcriber has first indicator means for notifying said mobile subscriber that said telephone-based data relay station selected by said subscriber has effected an off-hook condition giving said subscriber telephone line system access.

6. The system according to claim 1 wherein said mobile subscriber input/output data transcriber has second indicator means, for notifying said mobile subscriber that said telephone-based data relay station selected by said subscriber has encountered a telephone system line-busy condition.

7. The system according to claim 1, wherein the outputting of said data at said mobile subscriber input/output data transcriber output jack does not delete said data from said portable storage means of said mobile subscriber input/output data transcriber.

8. The system according to claim 1, wherein said mobile subscriber input/output data transcribing devices have means for automatically transmitting said device's own address along with said device's data transmissions.

9. The system according to claim 1, wherein said mass memory storage means of digital data within said portable receiver means comprises architecture inherent to expansion of said data character width.

10. The system according to claim 1, wherein said portable mass storage means has means for automatically overwriting existing data.

11. A landline telephone communication system comprising a plurality of subscriber loops, said loops allowing a telephone to be connected to telephone lines via conventional telephone connection means, and wherein said telephone has an automatic telephone message interception circuit attached which, upon detection of a coded signal sent from a calling telephone, prevents audible ringing of a called telephone instrument and activates said message interception circuit, said message interception circuit also allowing said called telephone instrument to be reclaimed for its ordinary use by the lifting of said called telephone handset, comprising:

a modularized telephone-based data relay station residing within said telephone instrument and connected to said message interception circuit for providing a plurality of data signal response means;

line receiver means residing within said telephone-based data relay station responsive to dial signal messages which a caller may send over said telephone lines;

telephone-based storage means residing within said telephone-based data relay station consisting of digital electronic memory for storing of said dial signals transmitted from said caller;

formatting means residing within said telephone-based data relay station for arranging said dial signals from said caller into a unique digital format suitable for system application;

first transmitting means residing within said telephone-based data relay station for aerially transmitting via infra-red signals said digitally formatted signals to a plurality of addressable mobile subscriber input/output data transcriber devices having transceiving means;

first automatic self-tuning means residing within said telephone-based data relay station whereby said first transmitting means has capability to automatically tune itself to output on the operating receiving frequency of any one of a plurality of said addressable mobile subscriber input/output data transcribers upon realizing a coded address sent to said telephone-based data relay station by said caller;

base station receiver means wherein said telephone-based data relay station has means for receiving transmitted signals from said mobile subscriber input/output data transcribing devices;

second automatic self-tuning means residing within said telephone-based data relay station for accepting system coded digitally formatted infra-red signals transmitted by said remote subscriber input/output data transcribers, said signals being first transmitted on a common system-wide access frequency and upon gaining of access to said telephone lines said second automatically self-tuning means accepts subsequent data to be transmitted by said mobile subscriber input/output data transcribing device on said mobile subscriber's input/output data transcribing device's private frequency;

line access means residing within said telephone-based data relay station for the purpose of effecting an off-hook condition of said telephone instrument connected to said telephone line, when it is desired by said mobile subscriber using said mobile subscriber input/output data transcribers to input data through the telephone system;

portable receiver means residing within said mobile subscriber input/output data transcribing device wherein a plurality of said mobile subscriber input/output data transcribing devices may acquire said infra-red digitally formatted signals transmitted by said first transmission means being located within said telephone-based data relay station;

second transmitting means wherein a plurality of said mobile subscriber input/output data transcribing devices may transmit infra-red digitally formatted signals to said base-station receiver means for the purpose of gaining telephone line access, and inputting subsequent data from said mobile subscriber input/output data transcriber devices;

portable storage means comprising mass memory capacity digital data recirculating shift registers for the transcribing in sufficient quantities to perform a data process application said data received at said portable receiver means;

output means for immediately and continuously throughputting said data received at said portable receiver means, making it available at said mobile subscriber input/output data transcriber output jack for writing to a hardcopy device; and remote control means comprising matrix-switched format incorporated within said mobile subscriber input/output data transcribing devices for subscriber inputting and application of line access signals and data signals transmitted by said second transmitting means.

12. The system according to claim 11 wherein said data output from said data transcriber output jack is in serial binary format.

13. The system according to claim 11 wherein said matrix-switched format of said remote control means incorporated within said data transcribing devices is a push-button keypad.

14. The system according to claim 11 wherein said dial signals sent over said telephone lines to said telephone-based data relay station are dual-tone-multiple-frequencies.

15. The system according to claim 11, wherein said mobile subscriber input/output data transcriber has first indicator means for notifying said mobile subscriber that said telephone-based data relay station selected by said subscriber has effected an off-hook condition giving said subscriber telephone line system access.

16. The system according to claim 11 wherein said mobile subscriber input/output data transcriber has second indicator means, for notifying said mobile subscriber that said telephone-based data relay station selected by said subscriber has encountered a telephone system line-busy condition.

17. The system according to claim 11, wherein the outputting of said data at said data transcriber output jack does not delete said data from said portable storage means.

18. The system according to claim 11, wherein said mobile subscriber input/output data transcribing devices have means for automatically transmitting said device's own address along with said device's data transmissions.

19. The system according to claim 11, wherein said mass memory capacity storage of digital data received by said portable transcribing device comprises architecture inherent to expansion of said data character width.

20. The system according to claim 11, wherein said portable storage means within said portable transcribing device has means for automatically overwriting existing data.

21. A telephone-based data communication system whereby a caller may transmit data through the telephone system by utilizing a telephone-based data signal processing means located entirely within a telephone instrument, said telephone instrument being wired to conventional telephone wires, said data signal processing means having, in addition to storage means, a detection means, whereby said caller may input a special code recognizable by said telephone-based data signal processing means located within the called telephone instrument, whereupon detection of said code is able to prevent normal audible ringing function in said called telephone instrument, said caller being able to consequently input data to said telephone-based data signal processing means of said called telephone, said caller input data including a remote input/output data transcribing device address which, upon receipt, is automatically formatted and stored in said called telephone instrument, first radio frequency response means residing within said called telephone instrument comprising transmitter means, whereby said called telephone-based data signal processing means may automatically convert said remote input/output data transcribing device's address to a select radio frequency communication link comprising a generated signal through which said called telephone instrument is able to communicate with said remote input/output data transcribing device, second radio frequency response means residing within said telephone instrument comprising receiver means, for automatically tuning said telephone-based data signal processing means to receive a radio signal from said remote input/output data transcribing device; and a remote input/output data transcriber device containing remote signal keying and processing means for enabling said input/output data transcriber device to communicate with said telephone-based data signal processing means via radio frequency means, said radio frequency means comprising receiver means within said remote input/output data transcriber device responsive to signal generated by said transmitter means residing within said telephone-based data signal processing means, a first remote input/output data transcriber device signal transmission means, for generating an output signal in order to gain telephone line sign-on access to said telephone-based data signal processing means, a second remote input/output data transcriber device signal transmission means, for enabling said remote input/output data transcriber device to output data using a private second frequency into said telephone-based data signal processing means, storage means within said remote input/output data transcriber having memory capacity to store a sufficient quantity of received raw data to accommodate a data application device control function, data output means to make said received raw data continuously available at convenient output jack of said remote input/output data transcriber devices.

22. A communication system whereby a telephone caller making contact with a central transmitting station may transfer a continuous quantity of raw data from a first digital data application device to a second digital data application device, comprising:
a plurality of addressable portable data transcribing devices small enough to be carried on a subscriber's person for providing an intermediate data link between said central transmitting station and said second data application device;
radio receiver means for enabling said portable data transcribing devices to receive signals from said transmitting station;
address decoding means responsive to said transmitting station signals for selecting desired said portable data transcriber;
expansive data storage means for enabling said portable data transcriber to hold in memory quantities of received data large enough to support programmable equipment control functions;
output means for allowing a data transmission cable to be conveniently connected into a jack mounted on said portable data transcriber for the outputting of said received data;
dual speed memory register buffer storage means for compensating for different said received data input and data output speeds of said portable data transcribers;
continuous data-throughput means for making said received data available at said portable data transcriber output;
transistorized line-driver means for driving said data transmission cable linking said portable data transcriber to said second data application device;
start-stop data transmission means for allowing said portable data transcriber to interface with said second digital data application devices using a similar protocol; and
indicator means for alerting said portable data transcriber carrier that said portable data transcriber requires on-line application.

* * * * *